United States Patent
Nakazawa et al.

(10) Patent No.: US 7,143,948 B2
(45) Date of Patent: Dec. 5, 2006

(54) READING METHOD OF THE TWO-DIMENSIONAL BAR CODE

(75) Inventors: Tsutomu Nakazawa, Isesaki (JP); Kouichi Hamakawa, Ojima-Machi (JP); Youji Takei, Kounosu (JP); Masanobu Kiyama, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 143 days.

(21) Appl. No.: 10/305,396

(22) Filed: Nov. 27, 2002

(65) Prior Publication Data

US 2003/0116628 A1     Jun. 26, 2003

(30) Foreign Application Priority Data

Nov. 30, 2001   (JP) ............... 2001-366802

(51) Int. Cl.
 *G06K 7/10*       (2006.01)
(52) U.S. Cl. ............... 235/462.1; 235/462.26; 235/462.25
(58) Field of Classification Search ........... 235/462.09, 235/462.1, 462.06, 462.25, 462.24, 462.26
 See application file for complete search history.

(56) References Cited

U.S. PATENT DOCUMENTS 5,510,607 A * 4/1996 Ishikawa ............. 235/462.2
6,003,773 A * 12/1999 Durbin et al. .......... 235/462.45
6,036,095 A * 3/2000 Seo .................. 235/472.01
6,332,574 B1 * 12/2001 Shigekusa et al. ..... 235/462.12
6,580,808 B1 * 6/2003 Rhoads ................. 382/100
6,606,421 B1 * 8/2003 Shaked et al. ........... 382/275
6,749,120 B1 * 6/2004 Hung et al. ........... 235/472.01
6,758,399 B1 * 7/2004 Brunelli et al. ........ 235/462.01
6,866,199 B1 * 3/2005 Keech et al. ............. 235/490

FOREIGN PATENT DOCUMENTS

JP          7-230522      8/1995
KR       2001-0053292    6/2001

* cited by examiner

*Primary Examiner*—Ahshik Kim
(74) *Attorney, Agent, or Firm*—Morrison & Foerster LLP

(57) ABSTRACT

A two-dimensional bar code printed on a piece of paper is photographed by the area sensor. A reading method of this bar code includes a process for correcting the distortion of the image of the two-dimensional bar code obtained from the area sensor by the projection transform, a process for correcting bright spots appearing in the image, and a process for decoding the two-dimensional bar code based on the image data of the two-dimensional bar code corrected by the two processes. This invention enables size-reduction of the reading device of the two-dimensional bar code and also achieves a higher reading speed of the reading device.

5 Claims, 6 Drawing Sheets

(A) The photographed image of the two-dimensional bar code.

(B) The photographed image of the grids.

(C) The grids corrected through the projection transform.

(D) The image of the two-dimensional bar code corrected through the projection transform.

( A ) The image of the two-dimensional bar code with a uniform brightness.

( B ) The photographed image of the two-dimensional bar code.

( C ) The image of the two-dimensional bar code through the divalent process.

( D ) The image of the two-dimensional bar code divided into a plurality of blocks.

READING METHOD OF THE TWO-DIMENSIONAL BAR CODE

BACKGROUND OF THE INVENTION

1. Field of the Invention

This invention relates to a reading method of a two-dimensional bar code, especially to a reading method of a two-dimensional bar code that facilitates both size reduction of a reading device and rapid reading.

2. Description of the Related Art

The Intacta code developed by the Intacta Loves Limited of the United States has been known as one of two-dimensional bar code systems. The Intacta code comprises black and white two-dimensional dot patterns. It is able to store high-density information, compared to a one-dimensional bar code. Therefore, it is possible to store multi-media information including musical data, image data, and text image data by coding them and utilizing a piece of paper with the Intacta code printed as an information-recording medium. The quantity of the information the Intacta code can store depends on the density of the dot patterns. The finer the dots (also called pixel elements) are, the more information can be stored.

The one-dimensional bar code is used for inventory management as well as sales management of merchandise, as it is placed on a variety of merchandise. However, since the quantity of the information stored in the one-dimensional bar code is limited, for example, only a search code of the merchandise can be recorded. The access to the vast amount of the data stored in the database is made based on the search code.

However, the information quantity the Intacta code can store in 1 cm$^2$ is about from 400 to 500 bites, making it possible to store a vast amount of merchandise information on a piece of paper. Therefore, it is one of advantages of the Intacta code that there is no need to establish an outside database.

A line sensor such as scanner has been used to read the Intacta code printed on a piece of paper. The Intacta code captured by the line sensor is then converted into digital data and inputted, for example, into a personal computer, where the original information of the Intacta code is reproduced by executing a reproduction program. The reproduction program for the Intacta code is widely available through the Internet.

As described above, the line sensor such as scanner is used to read the Intacta code printed on a piece of paper, which requires a driver circuit to operate the line sensor itself, leading to a complicated and enlarged reading device. Also, the reading is performed by scanning the lines one by one, making the reading speed very slow.

This invention is, therefore, directed to the size reduction of the reading device and to the improvement of the reading speed, by using an area sensor for reading the Intacta code.

However, when the focal distance of a lens mounted on the area sensor for reading the code is set to be short for the size reduction of the reading device, the projected image of the Intacta code has distortion and bright spots (brightness imbalance), preventing an accurate reproduction of the recorded information. There are two possible solutions to this problem, i.e., to make the focal distance longer or to reduce the information quantity of the Intacta code. However, the former solution will achieve the size reduction, and the latter solution will hinder the advantages of the Intacta code.

SUMMARY OF THE INVENTION

The reading method of a two-dimensional bard code of this invention includes the following three steps performed on an image of a two-dimensional bar code obtained through photographing of the two-dimensional bar code printed on a piece of paper by an area sensor:

1) a step for correcting distortion by a projection transform;
2) a step for correcting bright spots (brightness imbalance) appearing on the image;
3) a step for decoding the two-dimensional bar code based on the image data of the two-dimensional bar code corrected by the previous two steps.

Since the area sensor is used for reading of the two-dimensional bar code in this invention, the reading speed is dramatically improved, compared to that of the line sensor.

Also, the software processing steps 1 and 2 are employed for correcting the distortion and the bright spots, which appear on the two-dimensional bar code image photographed by the area sensor. Therefore, the compact area sensor with a short focal distance and a low price can be achieved, leading to the size reduction of the reading device.

DESCRIPTION OF THE INVENTION

Figure 1:
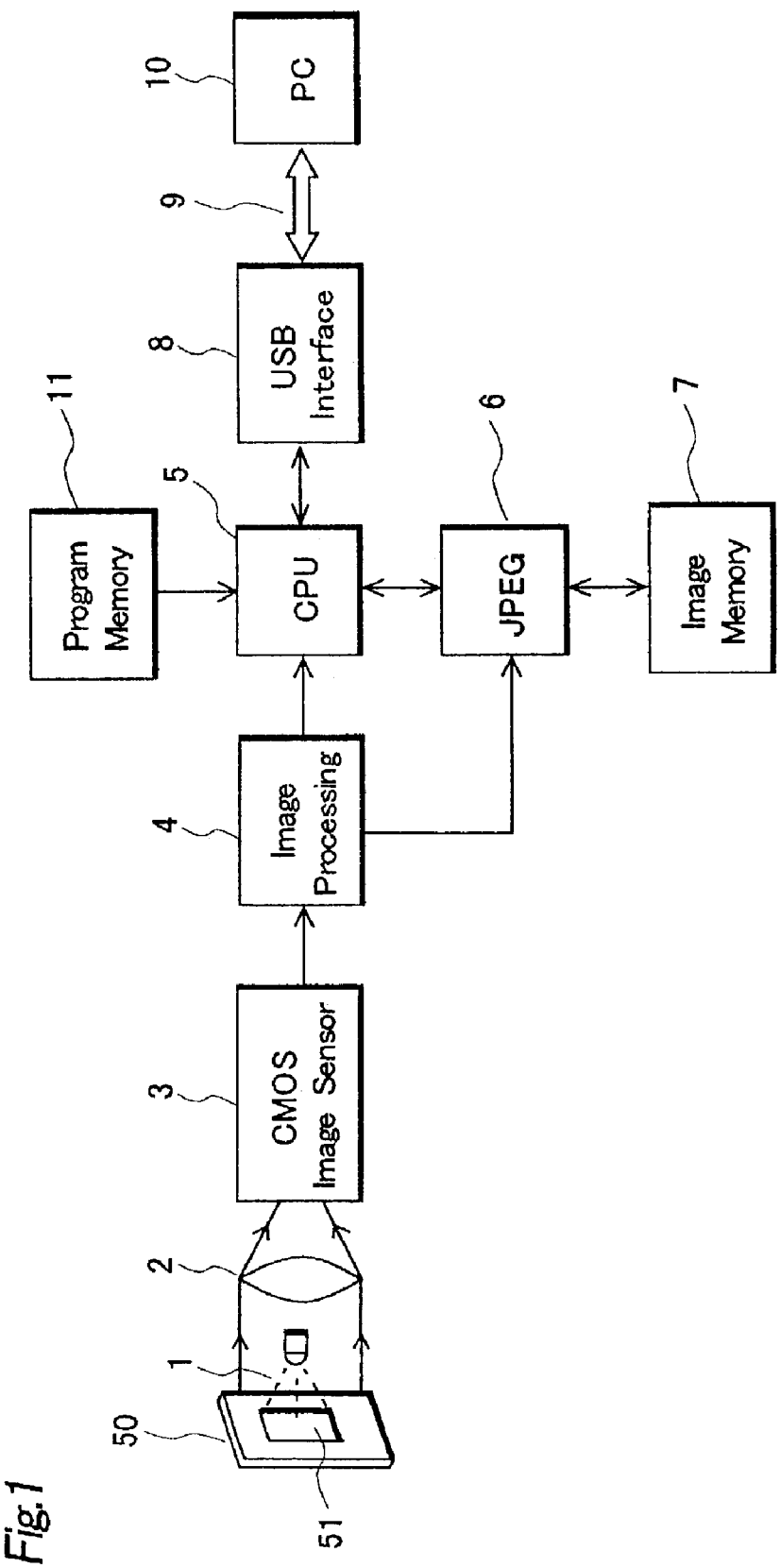
FIG. 1 is a block chart showing a configuration of a two-dimensional bar code reading system of an embodiment of this invention.

An embodiment of this invention will be explained by referring to drawings. FIG. 1 is a block chart showing the configuration of a two-dimensional bar code reading system of this invention. When a piece of paper (for example, a business card), on which a two-dimensional bar code (for example, the Intacta code) is printed, is inputted into a slot (not shown in the figure) of a reading device, a LED 1 turns on and sheds light to a code area 51 with the Intacta code printed on it. The image of the Intacta code coming through a lens 2 is then converted to an electric signal by an image sensor 3 such as CCD and CMOS. The LED 1, lens 2 and CMOS image sensor 3 provide a camera system.

An output signal from the CMOS image sensor 3 is converted to digital data according to a predetermined form by an image processing circuit 4. A JPEG unit 6 and an image memory 7 compress the image data outputted from the image processing circuit 4, based on a command from a CPU 5.

Then, the compressed image signal is sent to a personal computer 10 through an USB interface 8 and an USB cable 9. The CPU 5 controls the JPEG unit 6, the image memory 7, and the USB interface 8 based on the program stored in a program memory 11 (for example, a flash memory). The personal computer 10 will perform a variety of processing described later to the image data received.

In the two-dimensional bar code reading system, all the components described above, except the personal computer, provide the reading device with the area sensor.

Figure 2:
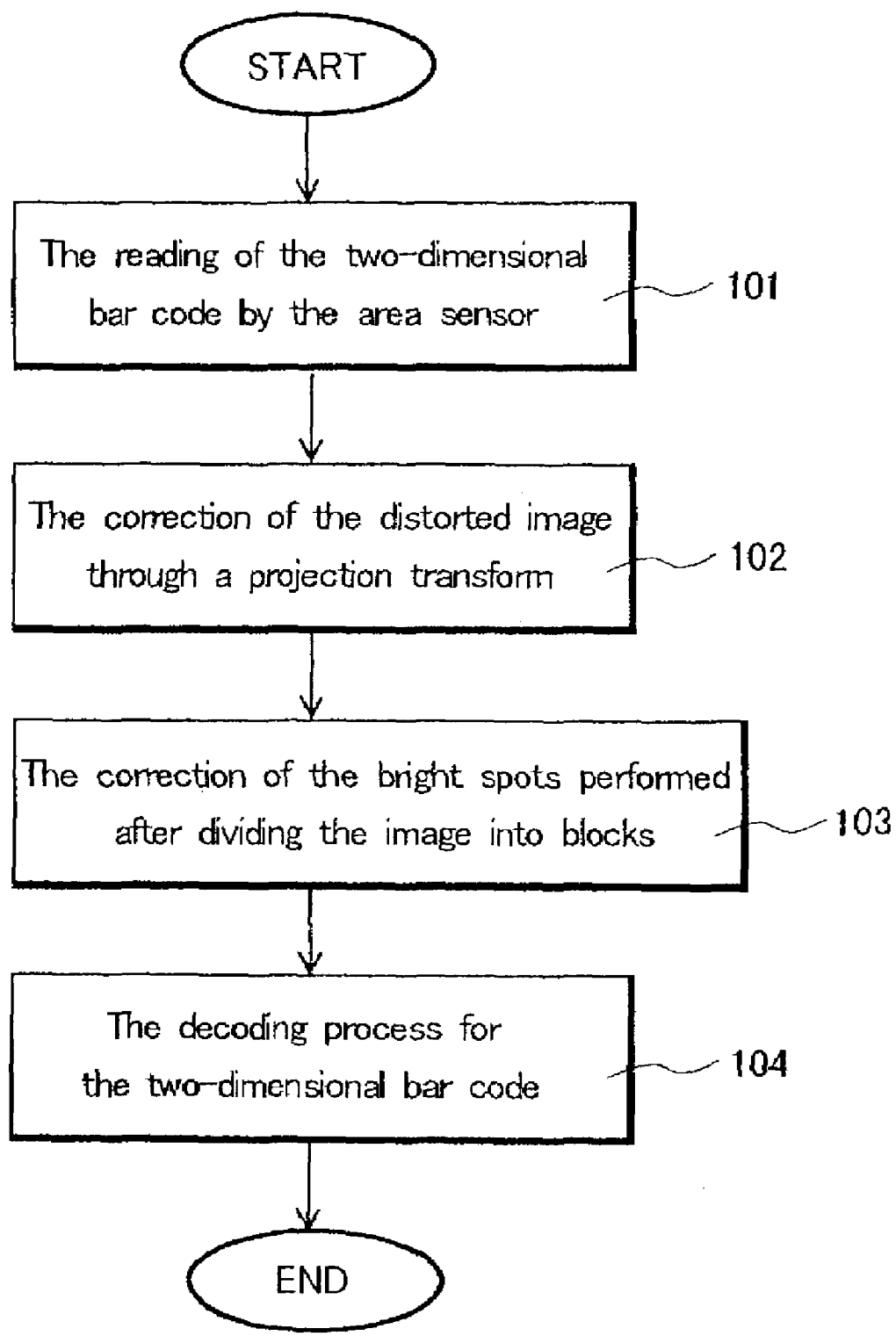
FIG. 2 is a flow chart showing the two-dimensional bar code reading method of this invention.

FIG. 2 is a flow chart showing a two-dimensional bar code reading method. The reading of the two-dimensional bar code by the reading device with the area sensor is performed at a step 101.

Next, the procedure moves on to a software processing by the personal computer 10. The correction of the distorted image is performed on the image data taken into the personal computer 10 at a step 102. This step is for correcting the distortion in the image, because some distortion takes place in the photographed image when the focal distance of the lens 2 is short or when the lens 2 is tilted.

Next, the bright spots in the image are corrected at a step 103. This step of correcting the bright spots is necessary because the LED 1 can not illuminate uniformly the area 51 of the Intacta code, which results in a variation in the brightness in the image. In this step, the correction is made in each block after dividing the image into a plurality of blocks. The order of performing the correcting steps 102, 103 can be reversed.

Then, the corrected image data is decoded at a step 104. For example, the Intacta code is decoded through the reproduction program of the Intacta code, reproducing the recorded information such as letters and images.

The correction of the distorted image through a projection transform at the step 102 and the correction of the bright spots performed after dividing the image into blocks at the step 103 will be explained by referring to FIGS. 3–7.

Figure 3:
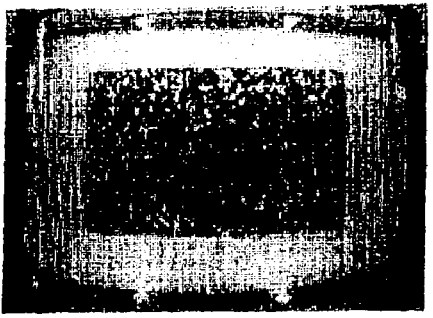
FIG. 3 shows a correcting procedure of a distortion of a bar code image through a projection transform.
Figure 3:
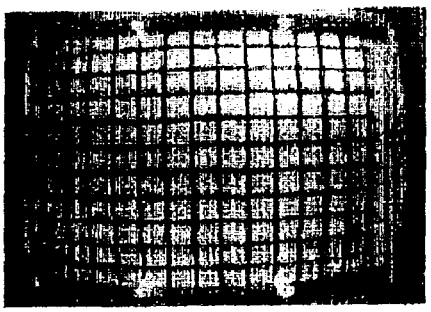
Figure 3:
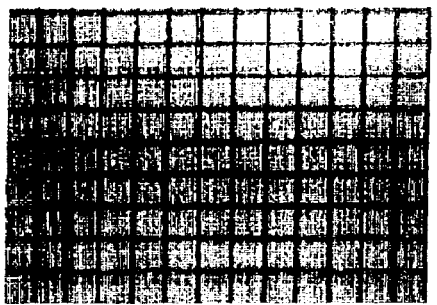
Figure 3:
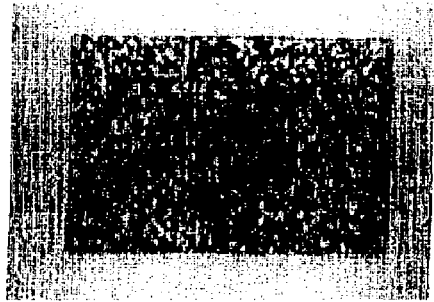
Figure 4:
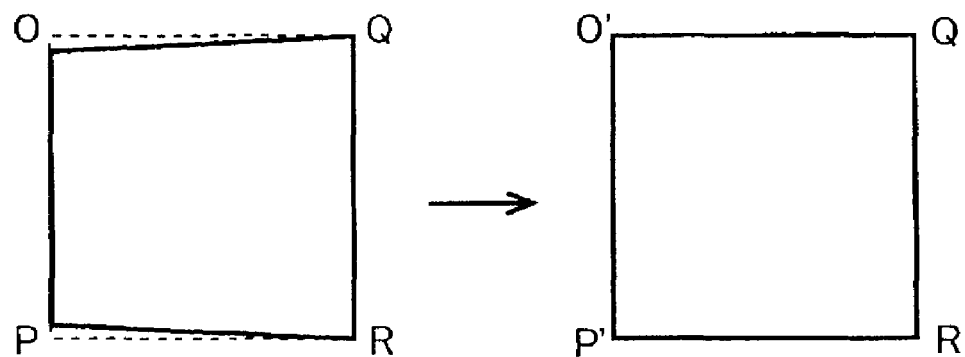
FIG. 4 shows the correcting procedure of FIG. 3 for a square of the distorted image.

FIGS. 3 and 4 show a correction scheme of the distorted image by the projection transform. The projection transform is a method of processing an image for shrinking or enlarging a part of the image. The projection transform can be obtained by, first determining the four points of the square to be transformed, and then deciding the coordinates, to which each of the points should be moved after the transform.

FIG. 3(A) shows the image of the two-dimensional bar code photographed by the reading device. The lens 2 with a short focal distance is used for the size reduction of the reading device. The close-up photographing distance (the distance between the lens 2 and the two-dimensional bar code printed on the piece of paper 50) of the camera is very short. It is seen that the peripheral area of the photographed two-dimensional bar code is somewhat rounded. Therefore, it is impossible to decode the bar code under this condition because of the distortion in the image. The shorter the close-up photographing distance of the camera is, the greater the distortion in the image is.

In order to correct the distortion, the image shown in FIG. 3(B) is obtained by photographing the grids printed on a similar piece of paper 50 by the reading device. The distortion of the grids is recognized in this image. The coordinates of the four corner points O, P, Q, R of one of the distorted squares of the distorted grids are obtained (FIG. 4).

The distorted square obtained from the procedure described above is then transformed to an accurate square by the projection transform. For example, as schematically seen from FIG. 4, the corner points O, P, Q, R before the transformation are moved to the corner points O', P', Q, R for obtaining the accurate square through the projection transform. As it is seen from the FIG. 3(C), the distorted squares are now corrected. The data for moving the pixel elements in each of the distorted squares to the correct locations can be acquired from the above mentioned processes. Then, the projection transform matrix is obtained and stored as the correction data.

The projection transform is then performed to the photographed image of the two-dimensional bar code (FIG. 3(A)) by using the correction data. The corrected image shown in FIG. 3(D) is, then, acquired. It can be seen from this image that the round shaping of the peripheral area of the image has been corrected. The reproduction of the two-dimensional bar code based on the corrected image now becomes possible.

Figure 5:
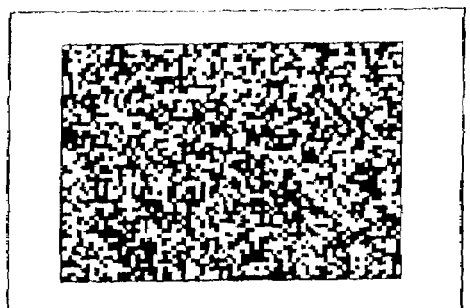
FIG. 5 shows a correcting procedure of brightness imbalance of the bar code image.
Figure 5:
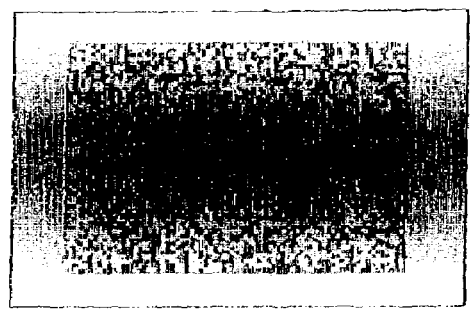
Figure 5:
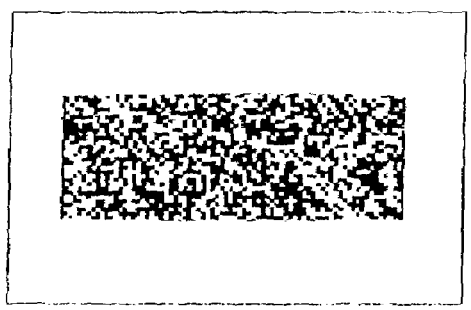
Figure 5:
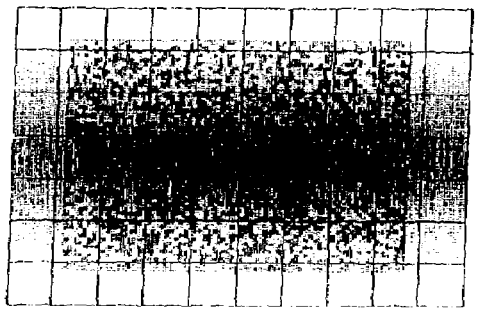
Figure 6:
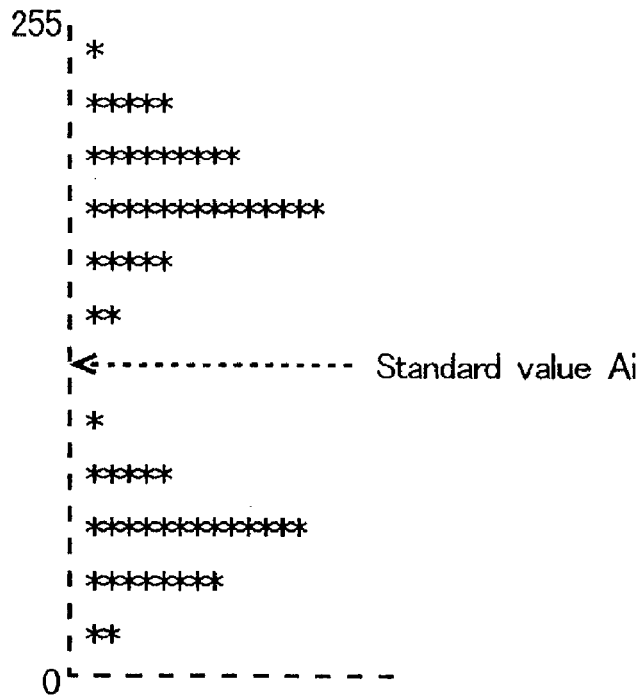
FIG. 6 shows a brightness distribution among pixel elements of a divided block of the bar code image.
Figure 7:
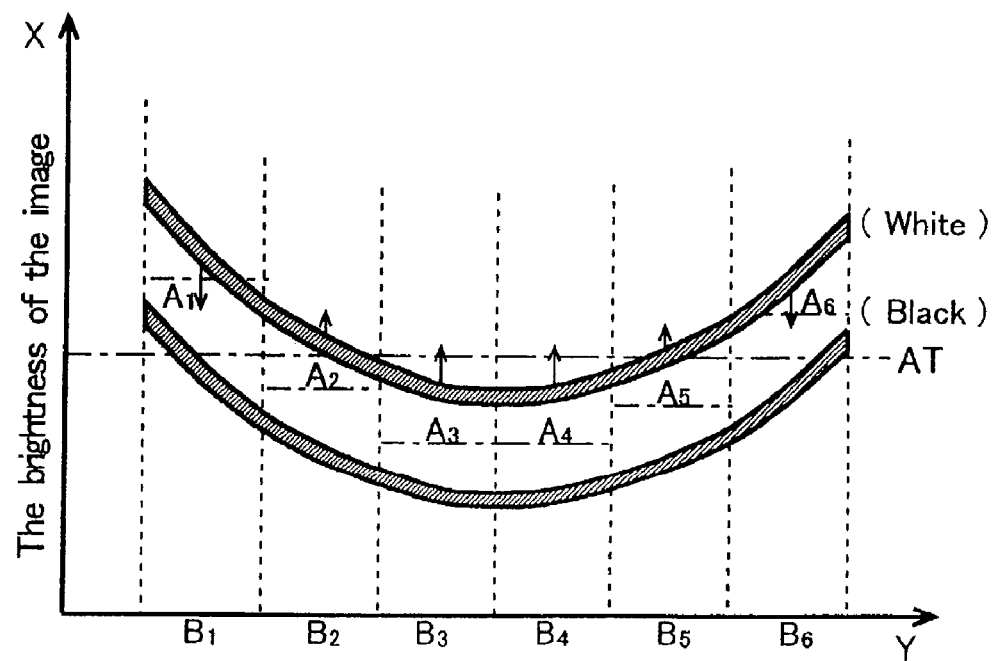
FIG. 7 shows the relationship between block standard values of the brightness and the standard value of the brightness of the whole bar code image.

Next, the bright spots correction in each divided block at the step 103 will be explained by referring to FIGS. 5–7. It is required to obtain an image with a uniform brightness such as the one shown in FIG. 5(A), when the reading device with the area sensor capture a photographic image of the two-dimensional bar code.

However, in practice, the image that has a variation in brightness, such as the one shown in FIG. 5(B), is obtained depending on the location of the LED 1 mounted on the reading device and other factors. In the example of the image shown in FIG. 5(B), the LED 1 is located near the upper and lower sides of the paper 50, making the upper and lower sides brighter than the middle of the image.

Therefore, it is not possible to accurately reproduce the two-dimensional bar code. The image processing is performed to the image with the varied brightness in order to acquire a proper image. The areas (pixel elements) with a brightness lower than a standard value (threshold value) are converted into black areas and the areas (pixel elements) with a brightness higher than the standard value are converted into white areas through this processing (referred to as a divalent processing, hereinafter), obtaining the image shown in FIG. 5(C).

Here, in the figure, the upper and lower parts of the image of the two-dimensional bar code do not appear. This is because the 'black' pixel elements in the brighter area located upper and lower parts of the image is brighter than the 'white' pixel elements in the darker area located in the middle. Thus, the 'black' pixel elements in the brighter area located upper and lower parts of the image are transformed into 'white' when the brightness correction is performed based on a single standard value.

The following process is performed to solve the problem mentioned above. The image data of the two-dimensional bar code photographed by the reading device is divided into a plurality of blocks Bi with a matrix configuration as shown in FIG. 5(D). The brightness correction is performed based on the standard value for each of the blocks Bi. That is, as seen from the FIG. 6, the distribution of the brightness (pixel element value) of the pixel elements (dots) is obtained for each of the blocks Bi.

The pixel element value is the value of the brightness expressed in numbers and it ranges from 0 to 255. The pixel element value 0 represents the darkest and the pixel element value 255 represents the brightest value. There are black pixel elements and white pixel elements in the image, thus the distribution of the pixel elements will be divided into concentrations of white and black. The pixel element value between the two concentrated areas is selected as a standard value Ai. Therefore, each of the standard values Ai has the value reflecting the brightness of each of the blocks Bi. When the distribution of black and white does not show the distinctive two concentrated areas, the value approximately in the middle of the distribution of black and white is chosen as the standard value Ai.

The distribution of the brightness (pixel element value) in the whole image is also obtained. A standard value AT in the whole image is obtained from the distribution of the brightness in the whole image through the same procedure. FIG. 7 schematically shows the brightness correction. The Y-axis shows one of the coordinates of the image. For example, the Y-axis may be the vertical axis of the paper shown in FIG. 5(D).

The area shown as the Y-axis is divided into six blocks B1–B6. The X-axis shows the brightness of the image (pixel element). The standard values of each of the blocks B1, B2, B3, B4, B5, B6 are A1, A2, A3, A4, A5, A6, respectively. The standard value for the whole image is shown as AT.

The brightness of each block is then corrected based on the standard value Ai of this particular block and the standard value AT of the whole image. For example, since A1>AT in the block B1, the distribution of black and white is shifted toward the darker side based on AΔ1, the difference between A1 and AT. In the block B3, on the other hand, A3<AT, thus, the distribution of black and white is shifted toward the brighter side based on AΔ3, the difference between A3 and AT.

In this manner, the brightness correction is performed for each block. The divalent data of the two-dimensional bar code is obtained by performing the divalent processing to the corrected image.

The Intacta code is used as an example of the two-dimensional bar code in this embodiment. However, this invention is not limited to this code. This invention is broadly applicable to the reading method of the two-dimensional bar code.

In this embodiment, the distortion correction and the brightness correction are performed by the software processing of the personal computer 10. However, it is also possible for the CPU 5, which is built in the reading device, to perform these tasks. In this case, the program for correction processing and the reproduction program for decoding the two-dimensional bar code should be stored in the program memory 11. The CPU 5 performs the correction processing and the decoding processing based on these programs.

In this invention, the image distortion due to the short focal distance of the lens and the varied brightness due to the short distance irradiation of light in the image of the two-dimensional bar code obtained from the area sensor are corrected before decoding the two-dimensional bar code through the reproduction program. Therefore, the size reduction of the reading device can be achieved. Also, the reading speed is improved, compared to the reading by a line scanner.

What is claimed is:

1. A reading method of a two-dimensional bar code, comprising:
    correcting a distortion of an image of the two-dimensional bar code obtained from an area sensor by a projection transform;
    correcting brightness imbalance of the bar code image; and
    decoding the two-dimensional bar code based on image data of the two-dimensional bar code after the distortion correction and the brightness correction,
    wherein the two-dimensional bar code comprises an Intacta code.

2. A reading method of a two-dimensional bar code, comprising:
    taking an image of the two-dimensional bar code by an area sensor;
    correcting a distortion of the taken image of the two-dimensional bar code;
    correcting brightness imbalance of the taken image of the two-dimensional bar code; and
    decoding the two-dimensional bar code based on image data of the two-dimensional bar code after the distortion correction and the brightness correction,
    wherein the distortion correction of the bar code image comprises taking an image of a calibration grid by the area sensor, obtaining a projection transform matrix that removes a distortion from the taken image of the calibration grid, and applying the obtained projection transform matrix to the taken image of the two-dimensional bar code so that the distortion of the taken image of the two-dimensional bar code is removed.

3. The reading method of a two-dimensional bar code of claim 2, wherein the brightness correction comprises dividing the image of the two-dimensional bar code into a plurality of blocks, and correcting the brightness imbalance for each of the blocks.

4. The reading method of a two-dimensional bar code of claim 3, wherein the brightness correction for each of the blocks comprises determining a block standard value based on a brightness distribution among pixel elements in said each of the blocks, and determining a standard value for the whole image based on a brightness distribution of the whole image, the brightness correction for each of the blocks being performed based on the block standard values and the standard value of the whole image.

5. The reading method of a two-dimensional bar code of claim 2, 3 or 4, wherein the two-dimensional bar code comprises an Intacta code.

* * * * *